A. Tyrrell,
Horseshoe.

Nº 47,502.    Patented Apr. 25, 1865.

Witnesses:
H. W. Soper.
Wm. G. Bryan

Inventor.
A. Tyrrell.

UNITED STATES PATENT OFFICE.

ALEXANDER TYRRELL, OF BATAVIA, NEW YORK, ASSIGNOR TO HIMSELF AND KIMBALL TERRIN, OF SAME PLACE.

IMPROVED HORSESHOE.

Specification forming part of Letters Patent No. 47,502, dated April 25, 1865.

*To all whom it may concern:*

Be it known that I, ALEXANDER TYRRELL, of Batavia, in the county of Genesee and State of New York, have invented a new and Improved Horseshoe to Cure and Prevent the Contraction of the Hoofs of Horses; and I do hereby declare that the following is a full and exact description thereof, reference being had to the accompanying drawings, and to the letters of reference marked thereon.

The nature of my invention consists in making a horseshoe having the usual calks on the under side, and with projections at the rear end on the upper inside, to fit against the inner side of the heel parts of the hoof, affording a firm support and shoulder, so that by expanding the shoe after the same is nailed to the hoof the hoof will be expanded and held in the desired position.

To enable others skilled in the art to make and use my invention, I will proceed to describe its construction and operation.

Figure 1:
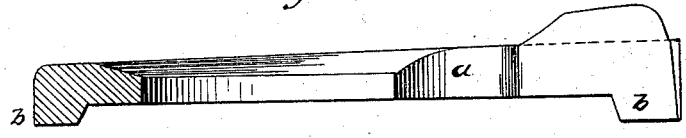
Figure 2:
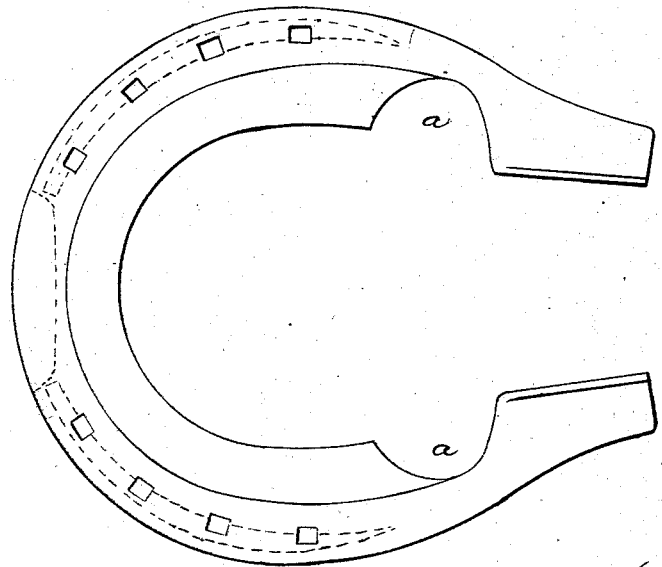

In the drawings, Figure 1 is a sectional elevation of my improved horseshoe. Fig. 2 is a top or plan view showing the recessed or narrowed portions *a a*.

The shoe is made in the ordinary form in its general outline, but with a portion between the toe and the heel upon each side made narrower than at other parts, to permit the shoe to be readily spread, as occasion may require. It is not essential that the recesses *a a* be made opposite each other, but at any point between the toe and heel, and the shoe may be with or without calks, as circumstances require. I form flanges on the upper inside of the heel of the shoe, projecting high enough to have the inside of the heel parts of the hoof press upon them, and fitted in the cavity between the frog and the said outer part of the hoof. After the shoe is secured to the hoof it may be spread open by any suitable instrument on either one or both sides, gradually from day to day, thus spreading the hoof to the desired width and shape.

Having thus described my invention, what I claim, and desire to secure by Letters Patent, is—

A horseshoe constructed, as described, with the recesses *a a* made at any point between the heel and toe, for the purpose specified.

A. TYRRELL.

In presence of—
 A. P. THAYER,
 EMMETT QUINN.